(12) United States Patent
MacKay

(10) Patent No.: US 6,898,148 B2
(45) Date of Patent: May 24, 2005

(54) MULTI-STEP RECEIVER-MOTION COMPENSATION

(75) Inventor: Scott William MacKay, Englewood, CO (US)

(73) Assignee: WesternGeco, L.L.C., Houston, TX (US)

( * ) Notice: Subject to any disclaimer, the term of this patent is extended or adjusted under 35 U.S.C. 154(b) by 246 days.

(21) Appl. No.: 10/400,166

(22) Filed: Mar. 26, 2003

(65) Prior Publication Data

US 2004/0190375 A1 Sep. 30, 2004

(51) Int. Cl.[7] .............................. G01V 1/00; G01V 1/38
(52) U.S. Cl. .............................. 367/52; 367/21; 367/50; 367/51
(58) Field of Search ........................ 367/21, 38, 50–52

(56) References Cited

U.S. PATENT DOCUMENTS

| | | | | |
|---|---|---|---|---|
| 5,050,129 A | * | 9/1991 | Schultz | 367/21 |
| 5,663,928 A | * | 9/1997 | De Bazelaire et al. | 367/52 |
| 5,982,706 A | * | 11/1999 | Byun | 367/52 |
| 6,049,507 A | * | 4/2000 | Allen | 367/21 |
| 6,151,556 A | * | 11/2000 | Allen | 702/18 |
| 6,480,440 B2 | * | 11/2002 | Douma et al. | 367/21 |
| 6,738,715 B2 | * | 5/2004 | Shatilo et al. | 702/17 |

OTHER PUBLICATIONS

"Effects of source and receiver motion on seismic data" by Hampson, G. and Jakubowicz, H; 1990; 60th Ann. Internat. Mtg. Soc. of Exploration Geophysicists; pp. 859–862.

The effects of source and receiver motion on seismic data; Geophysical Prospecting; European Assoc. of Geophysicists & Engineers; 1995, 43, 221–244.

"Marine vibrators and the Doppler effect"; by William H. Dragoset; 1998 Soc. of Exploration Geophysicists; 53, 1388–1398.

* cited by examiner

*Primary Examiner*—Thomas H. Tarcza
*Assistant Examiner*—Scott A. Hughes
(74) *Attorney, Agent, or Firm*—WesternGeco, L.L.C.; Jeffrey E. Griffin

(57) ABSTRACT

The present invention provides methods to be used in seismic data processing to address problems encountered during data acquisition. The present invention provides a multi-step process to reduce aliasing of seismic data along time slices.

23 Claims, 10 Drawing Sheets

MULTI-STEP RECEIVER-MOTION COMPENSATION

BACKGROUND OF THE INVENTION

In the acquisition of seismic data, seismic waves are used to interpret subsurface geological formations. Seismic prospecting employs a seismic source used to generate a wave that propagates through the earth to be detected by a seismic detector or receiver.

There is an inherent problem with data acquisition for a receiver in motion. Data acquired at later times need to be skewed spatially to match the zero-time reference. The schematic in FIG. 1 illustrates this concept. The vessel motion is towards the left and the receivers being towed are shown at two different times. The first time, T, is at the moment of the source or "shot," this is T=0. The figure shows sources behind and in front of the cable. Source position is not relevant for this example. At time T=1, the cable has moved to the left and the trailing receivers have now moved up a full receiver interval, as compared to the receivers at T=0. To compensate for the inconsistent spatial positioning, the data at T=1 must be skewed spatially in the direction of boat movement. For this shot, all the data at time slice T=1 are skewed one receiver increment, $\Delta x$, in the direction of boat movement. The value of $\Delta x$ is simply the product of boat speed and recording time:

$$\Delta x = -V_{boat} T. \qquad (1)$$

The negative value for $\Delta x$ implies that, for conventional geometries, where the source leads the cables, the data are moved to smaller offsets. Here, the data at T=1, for the receiver trace labeled 5, is mapped to location 4. This constant shift (mapping) is performed along time slices, thus preserving the original travel time of the data.

FIGS. 2 and 3 illustrate such mapping on shot-record coordinates (time versus offset). FIG. 2 shows a shot record and the curved lines represent the trajectory of reflected events. The horizontal dashed line corresponds to an arbitrary time slice prior to spatial skewing. FIG. 3 shows the data after spatial skewing. The originally vertical lines (FIG. 2) corresponding to the original trace positions are shown, now tilted, to illustrate the time-variant nature of the shift. A critical issue illustrated in FIG. 3 is that the steep trajectory of the seismic data along a shot record (curved lines) introduces a problem with aliasing when the time dip becomes large at greater offsets (data towards the right in FIG. 3). In this context, the term "aliasing" refers to the need to properly sample the data along the dashed, horizontal time slice indicated in FIG. 2. Sampling theory demands that the waveforms, horizontally sampled at the trace locations, must have at least two samples for the particular (spatial) frequency being sampled. If not, the sampled data are improperly sampled and are said to be aliased. When aliased, the frequency being sampled is incorrectly represented as a lower frequency (Sheriff, R. E., 1991, Encyclopedic Dictionary of Applied Geophysics, Fourth Edition: Soc. of Expl. Geophys.). Such aliasing problems are inherent in seismic data and represent a serious impediment to the routine implementation of the spatial-skew approach.

Thus, there is an interest in the art of seismic data processing to find improved methods to reduce the aliasing of seismic data while correcting for spatial-skew. The present invention addresses this interest.

SUMMARY OF THE INVENTION

The present invention addresses the problems inherent in data acquisition for a receiver in motion, specifically the problem of spatial aliasing of seismic data. To reduce the aliasing of seismic data along time slices during spatial-skew correction, the data correction is broken into several steps. The first step involves applying a moveout correction, such as normal moveout (NMO), to both the shot record and to the spatial-skew correction. After NMO correction, the maximum dip on the section is typically reduced and is equivalent to that of a zero-offset section, or "stacked" section. Next, the NMO-corrected spatial skew is applied. The spatial skew for a fixed time has now become a dynamic spatial compression of the data along an offset, instead of a single-valued shift. Next, a dynamic time correction may be applied to ensure that the data maps back to its original recording time after inverse NMO correction is applied. The cumulative effect of NMO correction (of the data and the spatial corrections), followed by dynamic spatial skew along a horizontal time slice, followed by dynamic time correction along vertical traces, and ending with inverse NMO, yields the equivalent of the spatial skew. However, spatial aliasing is significantly reduced in the process.

Thus, one embodiment of the present invention provides a method for reducing aliasing while removing positioning errors of seismic data comprising: applying a first moveout correction to the seismic data; applying a second moveout correction to a spatial skew, wherein the second moveout correction is related to the first moveout correction; applying the moveout-corrected spatial skew to the seismic data; and applying an inverse moveout correction to the seismic data, wherein the inverse moveout correction is related to the first moveout correction. Further, this embodiment of the present additionally may comprise applying a time correction to the seismic data. In addition, in one aspect of this embodiment, the first moveout correction may comprise a hyperbolic normal moveout or a linear normal moveout. Also, in this embodiment of the invention, the spatial skew step may be performed before the applying the time correction or the applying the time correction may be performed before the applying the spatial skew. In one aspect, the second moveout correction may be substantially similar to the first moveout correction. In addition, in aspects of this embodiment of the invention, the spatial skew may comprise a function comprising a boat speed, a function comprising a stacking velocity of the seismic data, a function comprising a traveltime of the seismic data, and/or a function comprising an original trace position of the seismic data. Also in one aspect of this embodiment, the time correction may comprise a function comprising a traveltime of the seismic data, a function comprising a trace position of the seismic data, and/or a function comprising a stacking velocity of the seismic data.

In another embodiment of the present invention, there is provided an article comprising one or more machine-readable storage media comprising instructions that when executed enable a processor to apply a first moveout correction to the seismic data; apply a second moveout correction to a spatial skew, wherein the second moveout correction is related to the first moveout correction; apply the moveout-corrected spatial skew to the seismic data; and apply an inverse moveout correction to the seismic data, wherein the inverse moveout correction is related to the first moveout correction.

A BRIEF DESCRIPTION OF THE DRAWINGS

So that the manner in which the above-recited features of the present invention can be understood in detail, a more particular description of the invention, briefly summarized above, may be had by reference to the embodiments of the invention which are described in the present specification and illustrated in the appended drawings. It is to be noted, however, that the specification and appended drawings illustrate only certain embodiments of this invention and are, therefore, not to be considered limiting of its scope as the invention may admit to equally effective alternative embodiments.

Figure 6:
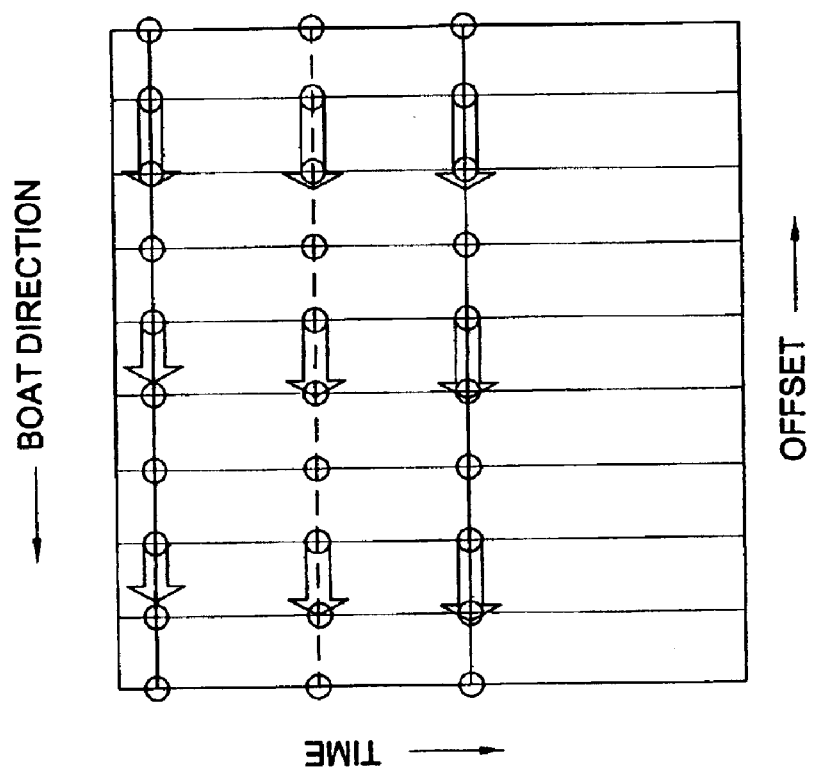

In FIG. 6, NMO correction has been applied to the seismic data and the corrections.

Figure 7:
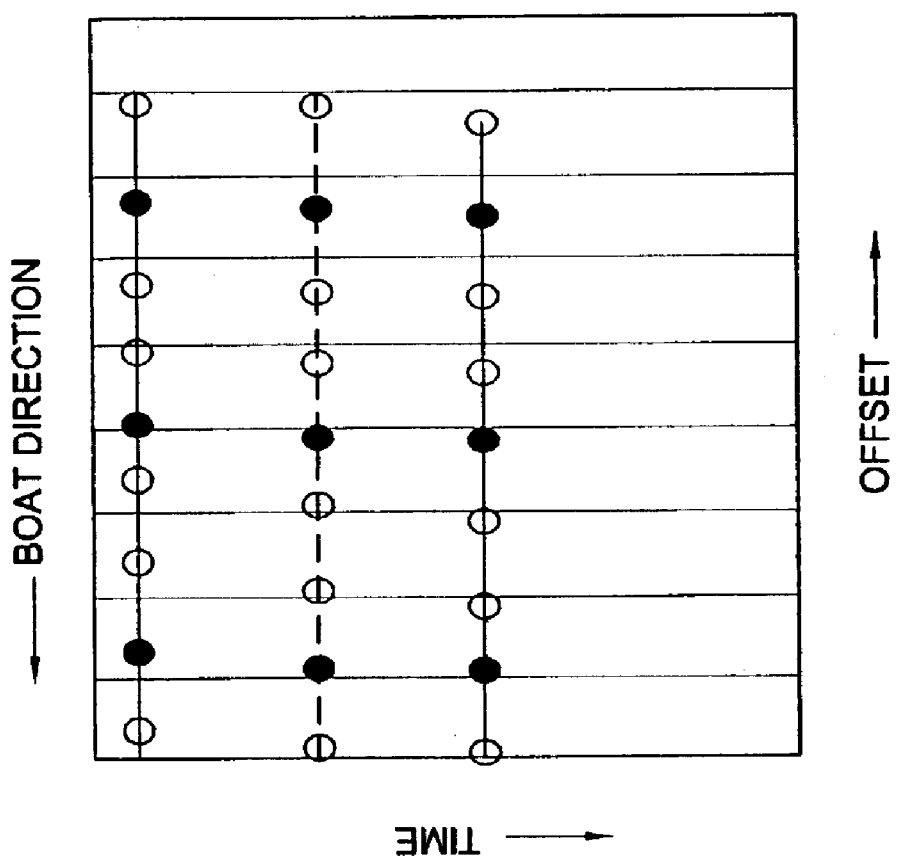

In FIG. 7, the spatial skew has been applied to the data. The original data points, are shown as circles.

Figure 8:
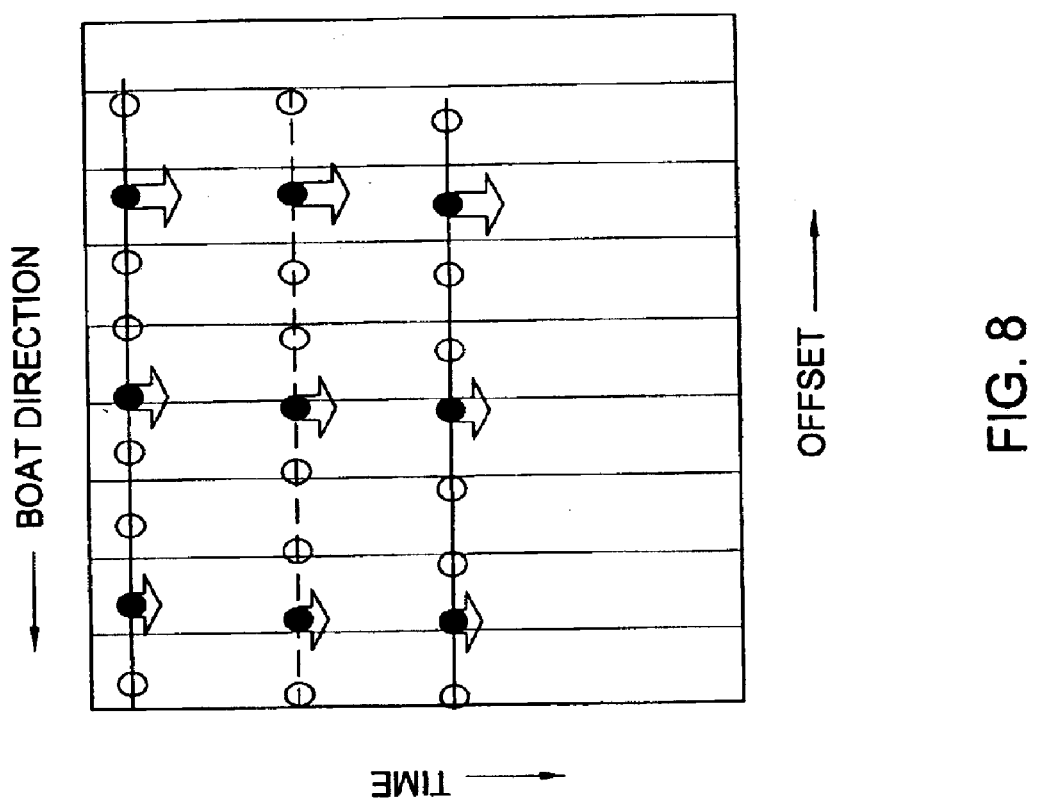

FIG. 8 shows the magnitude of vertical time correction to be applied to the data prior to inverse NMO correction.

Figure 9:
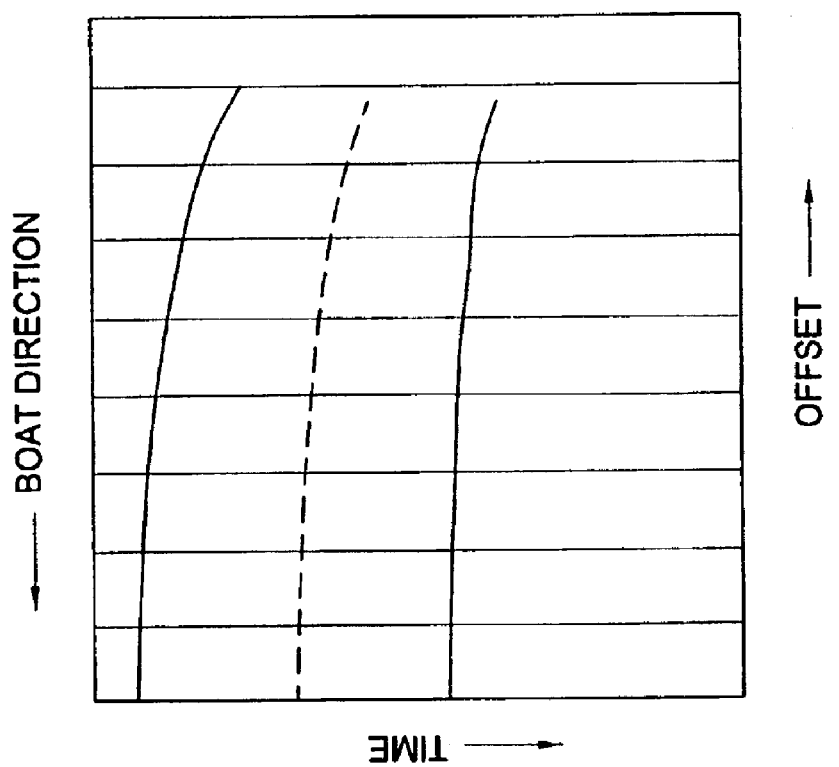

FIG. 9 shows the application of the residual time shifts.

Figure 10:
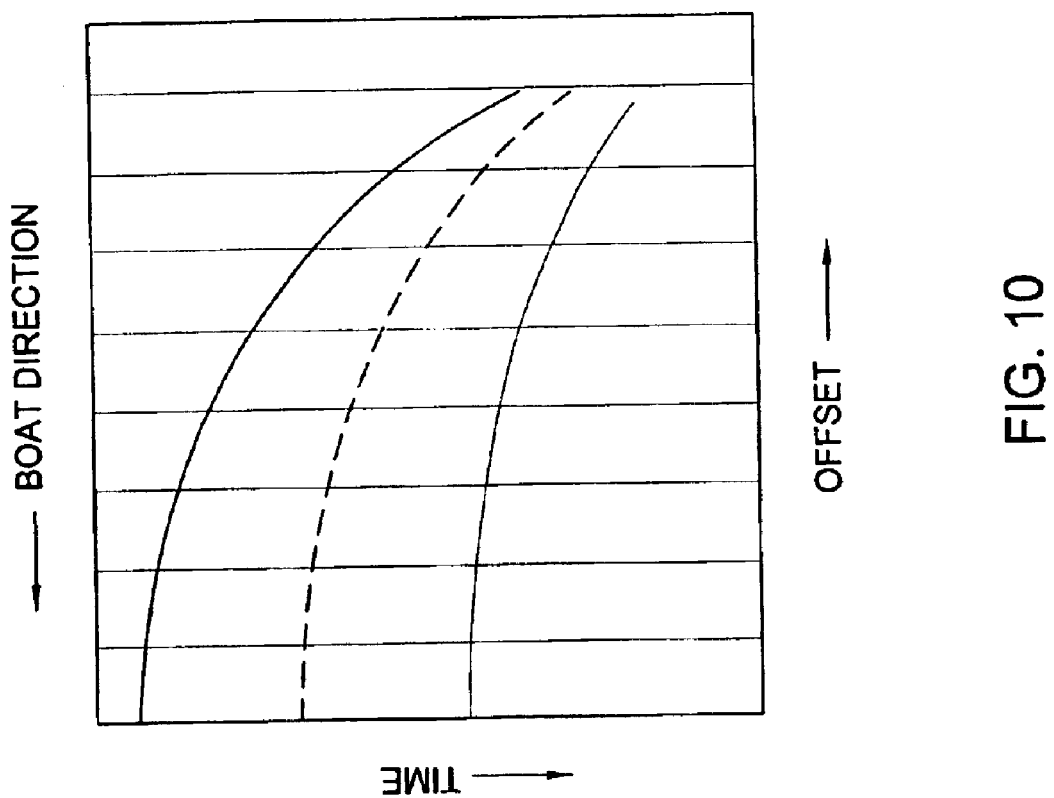

FIG. 10 shows the results after application of inverse NMO correction.

DETAILED DESCRIPTION OF THE INVENTION

Reference will now be made in detail to exemplary embodiments of the invention. While the invention will be described in conjunction with these embodiments it is to be understood that the described embodiments are not intended to limit the invention solely and specifically to only these embodiments. On the contrary, the invention is intended to cover alternatives, modifications, and equivalents that may be included within the spirit and the scope of the invention as defined by the attached claims.

Figure 1:
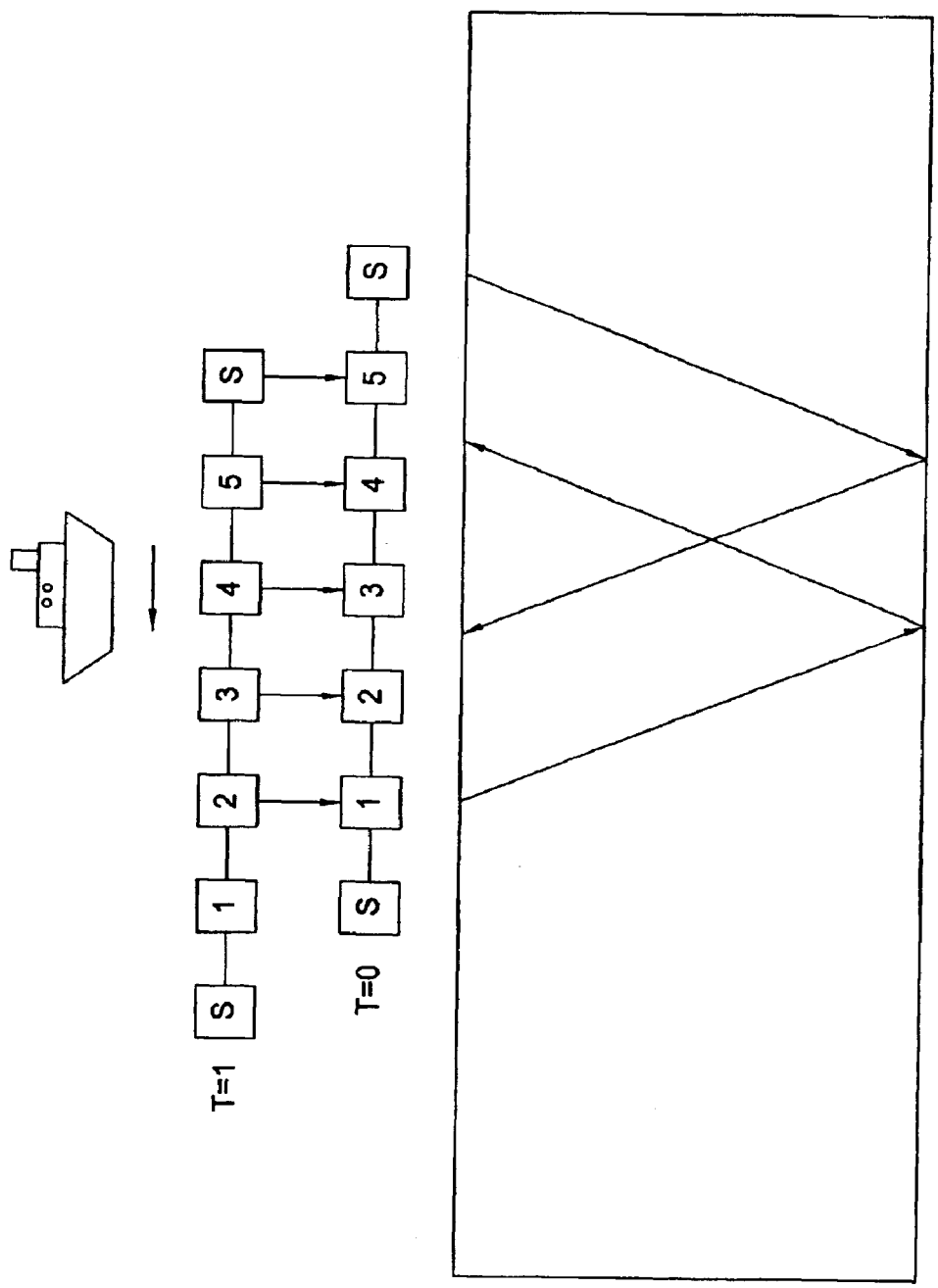
FIG. 1 is a schematic illustrating the problems inherent in data acquisition for a receiver in motion.
Figure 2:
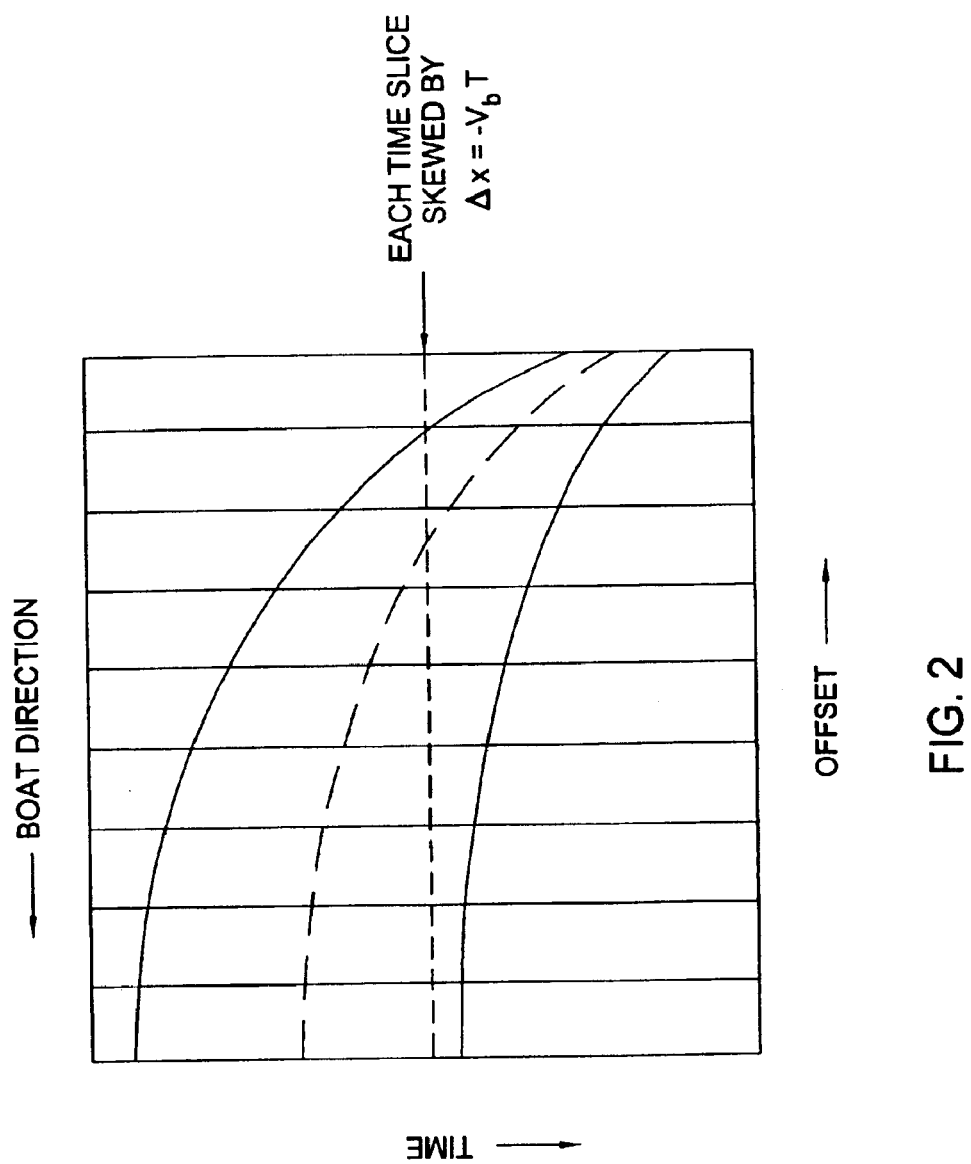
FIG. 2 shows a shot record of time versus offset, and the curved lines represent the trajectory of reflected events.

The present invention describes a method to be used in seismic data processing to address problems encountered during marine data acquisition. It is common during marine data acquisition that cables containing receivers, used to record the seismic wavefield, are towed behind a vessel. The motion of the towed receivers produces a dynamic positioning error in the data during conventional data processing. Dragoset, W. H., "Marine Vibrators and the Doppler Effect", Geophysics, Soc. Of Expl. Geophys., 53:1388–98 (1988) and Hampson and Jakubowicz, "The Effects of Source and Receiver Motion of Seismic Data", Geophys. Prosp., Eur. Assn, Geosci. Eng., 43:221–44 (1995) describe a correction method that involved skewing the seismic data along time slices to properly position the data spatially. However, the correction is applied to shot records that contain steeply dipping reflector information (as seen at far offsets to the right in FIG. 2). These data are susceptible to spatial aliasing and the correction described by the authors above becomes ineffective.

Figure 4:
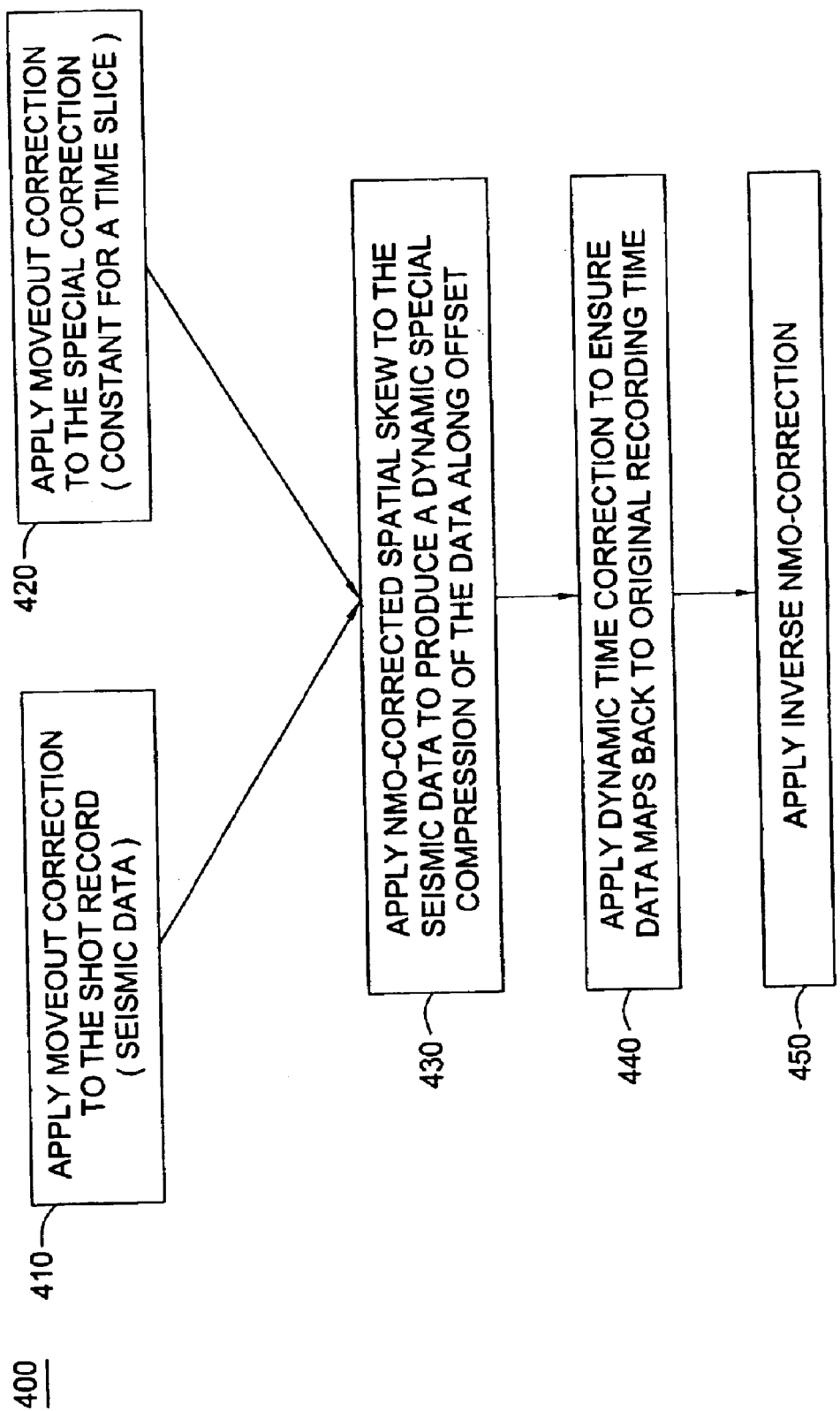
FIG. 4 is a flow chart of one embodiment of the methods of the present invention.

To reduce aliasing of seismic data along time slices, the spatial-skew correction is broken down into several steps. FIG. 4 is a flow diagram of one embodiment of this method 400. The first step 410 involves applying a moveout correction, in this case a hyperbolic NMO correction, to the shot record. The maximum dip on the section is now equivalent to that of a zero-offset section, or "stacked" section. Importantly, after NMO correction, the data now typically have significantly reduced time dips. For the methods of the present invention, hyperbolic NMO is not the only means of moveout. Other forms of moveout well known in the art, such as linear moveout, may also be applied.

Figure 5:
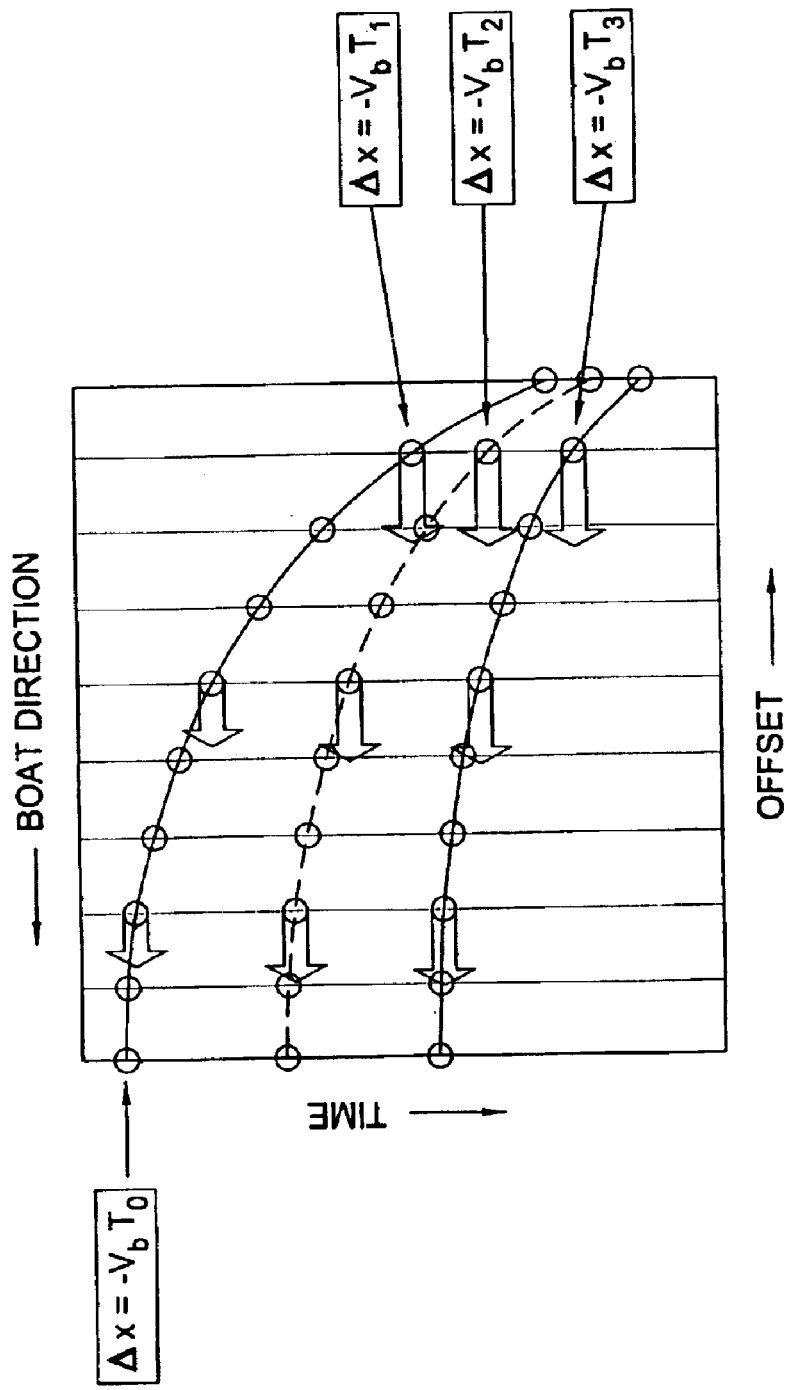
FIG. 5 is the same as FIG. 2, except that the horizontal spatial skews needed to correct the data are shown as arrows.

The spatial correction for the seismic data, constant for a time slice prior to NMO correction, is also NMO corrected 420. This is illustrated in the following figures. FIG. 5 is a repeat of FIG. 2, except that the horizontal spatial skews needed to correct the data are shown as arrows. More specifically, the seismic data located along the vertical offset traces are shown as open circles in FIG. 5. For reference, the spatial skews (arrows) are shown for three of the offset traces, and the associated data to be moved is shown with closed (solid) circles. The magnitude of the arrows represents the distance, $\Delta x$, at a particular sample. The shallowest curve (top) has relatively small corrections at shallow times and larger corrections at deeper times. The deepest moveout curve (bottom) has corrections that are more similar since it spans a smaller range of reflection times.

In FIG. 6, NMO correction is applied to the seismic data, and to the spatial correction. In this case, the data are now aligned horizontally, eliminating the spatial aliasing issue (this corresponds to the zero-dip case). Note that the spatial skew for a time slice is no longer a single value. It is now a dynamic shift and compression of the data. After NMO correction, the spatial skew, now a function of offset, X, may be defined as:

$$\Delta x = -V_{boat} T(X), \quad (2)$$

where T(X), now abbreviated as $T_x$ for simplicity, refers to the original two-way time of the event prior to NMO. The correction needs to be defined in terms of the NMO-corrected time slice, T(X=0), abbreviated $T_0$, as:

$$\Delta x = -V_{boat}[T_0^2 + (X/V_{RMS})^2]^{1/2}, \quad (3)$$

where $V_{RMS}$ is the stacking velocity of the data as a function of vertical two-way traveltime, $T_o$, at which the dynamic skew is being applied. More specifically, in equation (3) the value in brackets relates the NMO-corrected time, $T_o$, to the uncorrected time, $T_x$, for the case of hyperbolic NMO. This is just one possible form of moveout correction. Other forms are equally applicable and would result in slight alterations of the above equations.

The next step is to apply the spatial skew to the data 430 as illustrated in FIG. 7. The original data points, the circles that were along the vertical trace positions in FIG. 6, are shown in FIG. 7. In practice, the sampled data along an input time slice are mapped to the new spatial positions at the existing trace locations. This process is well known in the art and involves re-sampling and interpolation of the data (Sheriff, 1991). It is the resampling and interpolation step that is susceptible to spatial aliasing in the presence of steep dip.

Once the spatial skew has been applied to the data, an inverse NMO correct is applied to return the seismic data to its original form 450.

Since the data have now been mapped to smaller offsets—typically a few tens of meters difference—the inverse NMO process may result in the data being placed at too shallow a time. Therefore, prior to inverse NMO correction, a time correction may be applied to the data that will result in the data mapping to the original time after the application of inverse NMO correction 440. This time correction may be applied before or after the dynamic spatial correction.

Equation (4) below shows the derivation of this equation. The original time, $T_x$, at the original offset, X, (left side of equation (4)) is equated to a time-shifted ($\Delta t$) version of the spatially-skewed data (now at X+Δx) prior to inverse NMO, which is the right side of equation (4). This equation takes the form:

$$T_0^2+(X/V_{RMS})^2=[T_0+\Delta t]^2+[(X+\Delta x)/V_{RMS}]^2. \quad (4)$$

Expanding the squares and canceling like terms leaves:

$$0=\Delta t^2+2(T_0\Delta t)+(2X\Delta x+\Delta x^2)/V_{RMS}^2. \quad (5)$$

Equation (5) has a quadratic solution for Δt:

$$\Delta t=-T_0+[T_0^2-(2X\Delta x+\Delta x^2)/V_{RMS}^2]^{1/2}. \quad (6)$$

Applying the time shift, Δt, to the data at the new, spatially-skewed location prior to inverse NMO assists in restoring the original time. The values of X and Δx refer to the values corresponding to the original trace position, not the shifted position (by definition at X+Δx). In practice, this correction is extremely small (typically less than a time sample) and could be ignored. It is included here for completeness and accuracy. Further, for $\Delta t<<T_x$ equation (6) may be solved as:

$$\Delta t=-(2X\Delta x+\Delta x^2)/(2T_0V_{RMS}^2) \quad (7)$$

Figure 3:
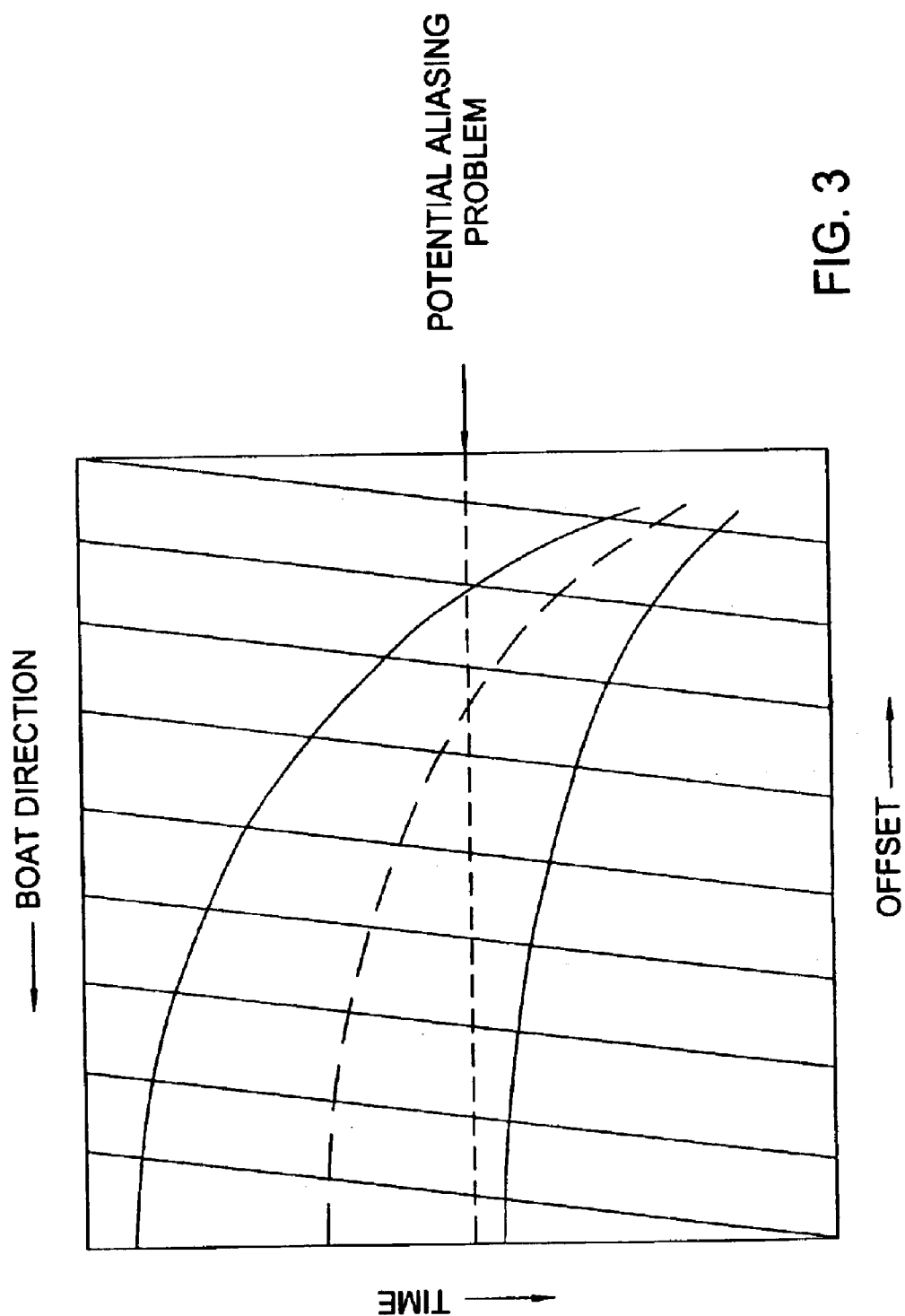
FIG. 3 illustrates the data of FIG. 2 after spatial skewing.

The value of Δt is typically a positive value, representing a downward shift along the time axis. FIG. 8 shows, qualitatively, the magnitude of the corrections. FIG. 9 shows the application of the residual time shifts prior to inverse NMO correction, as inverse NMO correction is then applied in FIG. 10. The results of FIG. 10 are theoretically identical to the exact solution of the spatial skew shown in FIG. 3. The difference is the better handling of spatial sampling (reduced spatial aliasing) using the multi-step approach described here.

In the method of the present invention, hyperbolic NMO was applied to the data. There are many possible moveout corrections that may be applied in the multi-step approach described herein. For example, linear moveout may be applied using a single velocity, $V_{LMO}$. The shift equation now becomes:

$$\Delta x=-V_{boat}[T_0+(X/V_{LMO})] \quad (8)$$

and the time correction becomes:

$$\Delta t=-\Delta x/V_{LMO}. \quad (9)$$

As before, the Δx value in equation (9) refers to the value used to spatially shift the original trace sample operated on. All forms of moveout result in a dynamic spatial skew and the need for a residual time correction. They are all implicit in the multi-step approach.

In addition, in the methods presented herein, the spatial skew is applied prior to the residual time correction. It is essentially identical to reverse the order of this process. Indeed, it may be desirable to apply the time correction prior to the skew. There are insignificant differences between the two ordering choices in terms of practical application. For example, if the data are time corrected, they are shifted (typically) downward in time. The spatial skew should also be time shifted. One skilled in the art recognizes that the equations can easily accommodate these contingencies. In other words, minor variations of the spatial-skew calculation or the time correction can create different sets of equations that have no meaningful difference to those presented here.

All publications cited in this specification are incorporated by reference as if each individual publication were specifically and individually indicated to be incorporated by reference. The citation of any publication is to provide context for and understanding of the present invention and should not be construed as an admission that the present invention is not entitled to antedate such publication.

Although the foregoing invention has been described in some detail by way of illustration and example for purposes of clarity of understanding, it is readily apparent to those of ordinary skill in the art in light of the teachings of this invention that certain changes and modifications may be made there to without departing from the spirit or scope of the appended claims.

What is claimed is:

1. A method for reducing aliasing while removing positioning errors of seismic data comprising:
   applying a first moveout correction to the seismic data;
   applying a second moveout correction to a spatial skew, wherein the second moveout correction is related to the first moveout correction;
   applying the moveout-corrected spatial skew to the seismic data; and
   applying an inverse moveout correction to the seismic data, wherein the inverse moveout correction is related to the first moveout correction.

2. The method of claim 1 additionally comprising applying a time correction to the seismic data.

3. The method of claim 1, wherein the first moveout correction comprises a hyperbolic normal moveout.

4. The method of claim 1, wherein the first moveout correction comprises a linear normal moveout.

5. The method of claim 2, wherein the applying the spatial skew step is performed before the applying the time correction.

6. The method of claim 2, wherein the applying the time correction is performed before the applying the spatial skew.

7. The method of claim 1, wherein the second moveout correction is substantially similar to the first moveout correction.

8. The method of claim 1, wherein the spatial skew comprises a function comprising a boat speed.

9. The method of claim 1, wherein the spatial skew comprises a function comprising a stacking velocity of the seismic data.

10. The method of claim 1, wherein the spatial skew comprises a function comprising a traveltime of the seismic data.

11. The method of claim 1, wherein the spatial skew comprises a function comprising an original trace position of the seismic data.

12. The method of claim 1, wherein the spatial skew comprises a function comprising a boat speed, an original trace position of the seismic data, a stacking velocity of the seismic data, and a traveltime of the seismic data.

13. The method of claim 2, wherein the time correction comprises a function comprising a traveltime of the seismic data.

14. The method of claim 2, wherein the time correction comprises a function comprising a trace position of the seismic data.

15. The method of claim 2, wherein the time correction comprises a function comprising a stacking velocity of the seismic data.

16. The method of claim 2, wherein the time correction comprises a function comprising a traveltime of the seismic data, a trace position of the seismic data, and a stacking velocity of the seismic data.

17. An article comprising one or more machine-readable storage media comprising instructions that when executed enable a processor to:

apply a first moveout correction to the seismic data;

apply a second moveout correction to a spatial skew, wherein the second moveout correction is related to the first moveout correction;

apply the moveout-corrected spatial skew to the seismic data; and apply an inverse moveout correction to the seismic data, wherein the inverse moveout correction is related to the first moveout correction.

18. The article of claim 17, further comprising applying a time correction to the seismic data.

19. The article of claim 17, wherein the first moveout correction comprises a hyperbolic normal moveout.

20. The article of claim 17, wherein the first moveout correction comprises a linear normal moveout.

21. The article of claim 17, wherein the spatial skew comprises a function comprising a boat speed, an original trace position of the seismic data, a stacking velocity of the seismic data, and a traveltime of the seismic data.

22. The article of claim 18, wherein the time correction comprises a function comprising a traveltime of the seismic data, a trace position of the seismic data, and a stacking velocity of the seismic data.

23. A method for removing positioning errors of seismic data comprising:

applying a first moveout correction to the seismic data;

a means for correcting the moveout-corrected seismic data to remove positioning errors of seismic data while reducing spatial aliasing; and applying an inverse moveout correction to the seismic data, wherein the inverse moveout correction is related to the first moveout correction.

* * * * *